(No Model.)
N. SANDERS.
BOLT FOR PLOWS.
No. 281,564. Patented July 17, 1883.
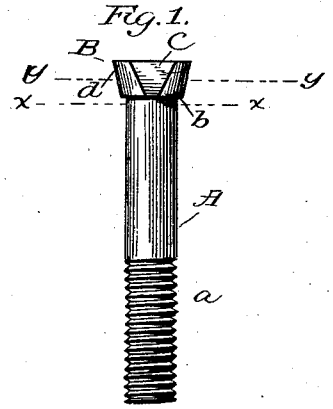
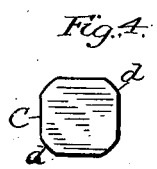
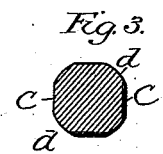
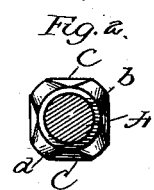
Attest:
Walter Donaldson
F. L. Middleton
Inventor
Newell Sanders
by Joyce & Spear
Attys.

UNITED STATES PATENT OFFICE.

NEWELL SANDERS, OF CHATTANOOGA, TENNESSEE.

BOLT FOR PLOWS.

SPECIFICATION forming part of Letters Patent No. 281,564, dated July 17, 1883.

Application filed April 13, 1883. (No model.)

*To all whom it may concern:*

Be it known that I, NEWELL SANDERS, of Chattanooga, in the county of Hamilton and State of Tennessee, have invented a new and useful Improvement in Bolts for Plows, &c.; and I do hereby declare that the following is a full, clear, and exact description of the same.

My invention relates to an improvement in metal bolts, intended especially for use in securing the mold-boards of plows, but applicable to other purposes.

Bolts of this class have frequently been used having an ordinary threaded stem and a conical head countersunk in a hole in the mold-board. The disadvantage of this form of bolt is that by the rusting of the nut on the threaded end great trouble and difficulty are frequently experienced in getting the nut off, on account of the conical head turning freely in its circular seat and offering no resistance to the wrench. To remedy this difficulty, plow-bolts were introduced having a square or frusto-pyramidal head countersunk in a similarly-shaped hole in the mold-board; but, while it removed the objections to the use of the bolt first mentioned, it was liable to others, principally from the cracking of the thin metal at the corners of the countersunk hole in which the bolt was placed from the strain to which such metal was sometimes necessarily subjected.

My invention consists in a bolt having a head of such shape that the advantages of the two forms of bolt described shall be retained and the objections removed—a head of substantially circular form at its lower edge, where it comes in contact with the thinner part of the mold-board around the hole, but of square form, with rounded corners at the top, the result being that the bolt cannot turn in the hole, while the effect of the strain is greatly lessened, and indeed practically lost.

In the accompanying drawings, Figure 1 is a side elevation. Fig. 2 is a section on line $xx$. Fig. 3 is a section on line $yy$. Fig. 4 is a top view.

The stem of the bolt is represented at A of the ordinary cylindrical form and having a thread, $a$.

B is the head of the bolt, which, at the intersection of the stem, is provided with a flat shoulder, $b$, of circular shape, as shown in Fig. 2.

C C are the flat sides of the head, which may be formed in any suitable manner. The flat sides are slightly inclined, as shown in Fig. 1, to fit the countersink, and as the flat side widens near the top the upper edge is nearly square, with rounded corners $d\ d$. This peculiar shape permits the countersink to be made square at the top, to prevent the bolt from turning, and circular at the bottom, where the metal is thin, to avoid the strain of the corners of the common square bolt-heads.

I do not claim as new or a part of my invention the shoulder under the head of the bolt, for I am aware of the fact that bolts have before been made with shouldered heads.

The shoulder is indeed not essential to my invention, for a bolt-head may be made embodying my invention that is not shouldered, but whose countersunk surface intersects the surface of the stem of the bolt.

Having described my invention, I claim—

1. A bolt having a head, A, the bottom edge of which is circular and the top square, with rounded corners.

2. A bolt having an inclined or countersunk head, with four flat sides and rounded corners.

In testimony whereof I have signed my name to this specification in the presence of two subscribing witnesses.

NEWELL SANDERS.

Witnesses:
　M. B. OCHS,
　ISIDOR WISE.